United States Patent Office 3,305,441
Patented Feb. 21, 1967

3,305,441
ATTENUATION OF PESTICIDAL RESIDUES ON SEEDS
Gustave K. Kohn, Berkeley, Calif., assignor to Chevron Research Company, San Francisco, Calif., a corporation of Delaware
No Drawing. Filed Oct. 12, 1965, Ser. No. 495,310
11 Claims. (Cl. 167—38)

This invention relates to a method for attenuating or destroying certain pesticidal residues present on plant tissues, particularly seeds. More particularly, it concerns a method for attenuating pesticide residues present on seeds which have been treated with pesticides which are amenable to chemical attack by aqueous solutions of ionizable sulfides, sulfites and thiosulfates.

In current agricultural practice, seeds or other propagative parts of plants are treated with chemicals to insure protection against injury or destruction due to fungi, insects, bacteria, harmful weeds, nematodes and other pests. After sowing, forest and agricultural seeds such as corn, cotton, sorghum, etc., are exposed to a wide variety of soil agents which may cause injury or destruction of the seed resulting in prevention of germination, late growth or malformation or destruction of the seedling in its developmental stages. To lessen and, hopefully, eliminate such losses, the seeds are treated prior to sowing with various pesticidal chemicals, usually by applying a solution, slurry or fine suspension of the chemicals. At times, plant nutrients and homones may be admixed with the pesticides. Seeds thus treated normally have residues of the pesticidal compounds ranging from a few to thousands of parts-per-million by weight.

Many of the pesticides used to treat and protect seeds are harmful to animal life, including man, when ingested internally. As a health precaution, therefore, governmental regulations restrict the amounts of certain pesticidal residues allowable on seeds which are offered or intended for animal or human consumption.

It has now been found that certain of the pesticidal residues commonly present on seeds may be effectively attenuated or destroyed so as to leave the seeds essentially free of these residues. Hence, seeds which have been treated exclusively with the pesticides to which this invention is directed may be reclaimed for potential use as human or animal feed. Also, seeds which may be adversely affected by prolonged contact with pesticidal residues may be subjected to this process and thereby saved for future use. The seeds which are subjected to the unique process of this invention in many cases will have less than 10 p.p.m. of the pesticide remaining on them and frequently less than 1 p.p.m.

In practical terms, the process of this invention applies to seeds or other plant parts which have been treated with pesticidal compounds having a methyl phosphate group or a halogen of atomic number 17 to 53 which is bonded to a saturated carbon atom which is alpha or beta to an oxygen or sulfur atom and comprises contacting the treated seeds with an aqueous solution of an ionizable sulfide, sulfite or thiosulfate at a pH of at least about 7 under time and temperature conditions sufficient to permit attenuation of the pesticide residue without material damage to the seeds. Halogens of atomic number 17 to 53 are chlorine, bromine and iodine. A saturated carbon atom is one which is covalently bonded to four other atoms. A carbon atom which is alpha or beta to an oxygen or sulfur atom is one which is either adjacent to or one atom removed from the oxygen or sulfur atom. The nature of the atom which may be intermediate to the saturated carbon atom and the oxygen or sulfur atom is not critical; however, it will usually be another saturated carbon atom. In many cases, the destruction of the pesticide by the process of this invention may be termed total in that only inorganic fragments or either volatile or soluble innocuous fragments result. As distinguished from a mere washing operation, the present process embraces actual chemical destruction as well as physical removal of the residue.

Examples of pesticides of the halogen-containing type are N-polyhaloalkylthio fungicides, polyhaloalkyl sulfonate fungicides, polyhaloalkyl phosphate insecticides, polyhaloalkyl disulfide pesticides and the like.

Although the halogen-containing and methyl phosphate pesticides represent those to which this process is most likely to be applied, this process may also effect attenuation of pesticidal residues on seeds which have been treated with pesticides which have a halogen of atomic number 17 to 53 bonded to an aromatic nucleus or quinoidal structure having a strong electron-withdrawing substituent such as $NO_2$, $CN$ and the like which is ortho or para to the halogen.

A current class of pesticides which is encompassed in the halogen-containing category are the N-polyhaloalkylthio fungicides. In these fungicides the alkyl group which is bonded to the sulfur atom has 1 to 2 carbon atoms and is substituted with 1 to 5 halogen atoms, at least one of which has an atomic number from 17 to 35. Other functionalities such as $NO_2$, F, etc., may also be substituted on the alkyl group.

Illustrative of such N-polyhaloalkylthio groups are: N-perchloromethylthio, N-perbromoethylthio, N-(2,2,2-trichloroethylthio), N-(2-bromo-2,2-dichloroethylthio), N-(1,2,2-tribromoethylthio), N-(1-chloro-2,2-dibromoethylthio), N-(1,1,2-trichloroethylthio), N-(1,1-dichloroethylthio), N-(1,1,2,2-tetrachloroethylthio), N-(1,1,2,2-tetrachloroethyldithio), N-(1,1-dichloro - 2,2 - dibromoethylthio), N-(1,2,2-trichloro-2-bromoethylthio), N-(1,2,2,2-tetrabromoethyldithio), N-(1,2,2-trichloro-2-bromoethylthio), N-(1-bromo-2,2,2-trichloroethylthio), N-(perchloroethylthio), N-(1,1-dichloro-2,2,2-tribromoethyldithio), N-(1-chloro-1-nitroethylthio), N-(1-chloro-2,2,2-trifluoroethylthio), etc.

As regards the attenuation or destruction of the fungicide residue, the N-polyhaloalkylthio functionality is of prime importance. The remaining portion of these fungicidal compounds is less important from a degradative standpoint. In general, the two remaining valences of the nitrogen may be satisfied by a single divalent acyl radical or by two separate monovalent radicals. Fungicides of this type are well known. See U.S. Patent Nos. 2,553,770, 3,036,088 and 3,178,477. Illustrative of the more common fungicides containing the N-polyhaloalkylthio functionality with which seeds may be treated are N-(1,1,2,2 - tetrachloroethylthio)-cis-$\Delta^4$-tetrahydrophthalimide, N - (trichloromethylthio)-cis-$\Delta^4$-tetrahydrophthalimide, N-(trichloromethylthio)-phthalimide, etc.

As previously indicated, the process of this invention is applicable to seeds which have been treated with pesticidally-active methyl phosphate derivatives. Although the process of this invention may effect some destruction of other alkyl phosphates, the reactivity of the methyl group as compared to others in this type of compound makes it particularly susceptible to attenuation by this method. The term "phosphate" as used herein includes thio derivatives thereof. Usually, these methyl phosphates are insecticides containing a dimethyl phosphate radical having the general formula:

(1) 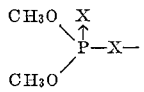

wherein X is chalcogen of atomic number 8 to 16, i.e., oxygen or sulfur. From a degradative viewpoint the above-described dimethyl phosphate, thiophosphate or dithiophosphate radical is an important functionality of these phosphate pesticides. The remaining valence of the radical of Formula 1 may be satisfied by a wide variety of organic residues. In some instances, this valence may be satisfied by a polyhaloalkyl group thus giving the particular compound two functionalities susceptible to chemical degradation under the conditions of this process. In illustration of the types of phosphate pesticide residues contemplated are the following specific pesticidal compounds: O,O-dimethyl-S-[1,2-bis(ethoxycarbonyl)-ethyl] phosphorodithioate (malathion), O,O-dimethyl-O-p-nitrophenyl thiophosphate (methylparathion), 1-chloro-1-diethylcarbamoyl-1-propene-2-yl-dimethyl phosphate (phosphamidon), 1,2-dibromo-2,2-dichloroethyl dimethyl phosphate (naled), dimethyl-2,2-dichlorovinyl phosphate (DDVP), 1-dimethylcarbamoyl-1-propene-2-yl-dimethyl phosphate (bidrin), etc.

The sulfur compounds which are used in contacting the pesticide-treated seeds are sulfides including mercaptans, mercaptides and inorganic sulfides, inorganic sulfites and inorganic thiosulfates which ionize when put into an aqueous solution at a pH of at least about 7. For the weakly ionizable sulfur compounds such as mercaptans and mercaptides alkaline pH's are necessary to obtain effective ionization. Because of their availability and ease of handling, the inorganic sulfides, sulfites and thiosulfates are preferred. Particularly preferred are the inorganic sulfides.

The mercaptans and mercaptides which may find use in the process of this invention include alkyl mercaptans, cycloalkyl mercaptans and aromatic mercaptans and their akaline metal or alkaline earth metal mercaptides. Usually the alkyl mercaptans and mercaptides will have about 1 to 12 carbon atoms. The aromatic mercaptans and mercaptides will normally have 6 to about 18 carbon atoms. Illustrative of some of the mercaptans and mercaptides which may be employed in this invention are methyl mercaptan, ethyl mercaptan, isopropyl mercaptan, butyl mercaptan, heptyl mercaptan, 2-ethylhexyl mercaptan, octyl mercaptan, decyl mercaptan, dodecyl mercaptan, cyclohexyl mercaptan, thiophenol, sodium methyl mercaptide, potassium ethyl mercaptide, sodium amyl mercaptide, potassium octyl mercaptide, calcium methyl mercaptide, sodium thiophenate, potassium thiophenate, etc.

The inorganic sulfides of the preferred class include monosulfides and polysulfides, e.g., di-, tri-, tetra-, penta-, etc. The inorganic positive salt-forming group of these sulfides may be an alkali metal cation, alkaline earth metal cation, alkaline earth metal cation or ammonium ion. Illustrative sulfides and polysulfides are sodium sulfide, potassium sulfide, calcium sulfide, magnesium sulfide, ammonium sulfide, calcium polysulfide, ammonium polysulfide, sodium polysulfide, lithium polysulfide, barium polysulfide, etc.

The inorganic sulfites and thiosulaftes of this invention are defined by the general formula:

(2) $(A)_x(S)_zO_3$ wherein A is an inorganic positive salt-forming group such as alkali metal cation, alkaline earth metal cation or ammonium ion, $x$ is an integer equal to (3—valence of A) and $z$ is an integer from 1 to 2. Examples of sulfites and thiosulfates which are within Formula 2 are sodium sulfite, potassium sulfite, calcium sulfite, ammonium sulfite, sodium thiosulfate, potassium thiosulfate, ammonium thiosulafte, etc. Polythiosulaftes and polysulfites may be used but their complexity makes them presently impractical for use in this invention.

The pesticide-treated seeds are contacted with an aqueous solution of the sulfur compound at a pH of at least 7, and preferably between 8 to 12. Highly caustic solutions should be avoided. Basic solutions have greater ionizing potential in the present system. In order to attain the preferred basicity it may be necessary to affirmatively add compounds which will act as proton acceptors in the aqueous medium. For convenience, the common caustics, i.e., sodium and potassium hydroxide, may be used for this purpose. Preferably water is used as the aqueous solvent; however, other ssytems such as aqueous alcohol, aqueous dioxane, aqueous acetone, aqueous dimethyl sulfoxide, aqueous amines and the like may be used. The nature of the medium and its basicity should be adjusted so that the solubility of the sulfur compound is at least 1 gm. per liter of solvent.

In order to attain sufficient attenuation and decay of the pesticides on the seeds, the concentration of the sulfur compound solution should be at least 0.1 weight percent based on the water content of the aqueous solvent. In terms of a range, solutions having a sulfur compound concentration between 0.1–50 weight percent will be used, with solutions from 2 to 30 weight percent being preferred.

In order to increase the efficiency of the contacting, a surfactant may be concomitantly employed in the process. The surfactant used should be stable at the pH's involved in the process and compatible with the alkaline earth metal cations which may be present. That is, a surfactant stable at pH's in excess of 7 and which does not form a precipitate with such cations may be used. Agents meeting these requirements are well known in the art (see A. M. Schwartz and J. W. Perry, "Surface Active Agents," Interscience Publishers, (1947), and it is believed that a chemist of ordinary skill could readily pick a suitable surfactant from the art. Within the above requirements anionic, nonionic, inorganic surfactants, etc., may be thus used. Preferably, a nonionic surfactant is used. Further, other builders, adjuvants, etc., may also be used concurrently with the solvent.

The amount of surface-active agent used is not critical in the process. Usually, between about .01 to 20 g. per liter of solvent will be sufficient.

For the most part the temperature employed in the contacting of the seeds is also not critical. However, excessive temperatures should be avoided as they may cause damage to the seed such as swelling, splitting and general cooking and digestion. For this reason, temperatures from 0 to about 50° C. are preferred. In general, the rate of attenuation and pesticide destruction increases with increasing temperature. Therefore, if shorter contact times are desired, temperatures in the upper half of the above range, i.e., about 25 to 50° C. may be used. Adequate destruction is usually achieved within from about 30 seconds to 30 minutes contact time under the above conditions. More usually, the contact time will be between about 1 to 15 minutes.

Efficient contacting of the seeds may be effected by a variety of means. In a batch operation, the seeds, sulfur compound, solvent and surfactant may be charged to a vessel equipped with an agitation means and, if desired, a heating means. After sufficient contact time, the solvent may be drained off and the seeds washed and allowed to dry. Agitation may be brought about by rotary motion, stirring, etc. Harsh agitation should be avoided as excessive abrasion of the seeds may occur.

Alternatively, the contacting may be accomplished by continuous methods. For instance, the seeds may be contacted with the sulfur compound solution in a system equipped to feed the seeds countercurrent to the solution. An example of such a system would be a seed hopper attached to a screw conveyer which is skewed upward, with a gravity solution feed at the upper end of the conveyer. The conveyer could be sized and the solution feed regulated to attain a contact time sufficient to attain adequate removal of the pesticide from the seeds.

After contacting the sulfur compound solution, the seeds may be washed with water in order to cleanse the seeds of contaminated sulfur compound solution and degradation products which may have been formed. A single washing will usually be adequate; however, multiple water washings may be effected if desired. After the water wash, the seeds may be allowed to dry. Consecutive cycles of treatment and rinses may also be used if desired.

The seeds which are normally treated with pesticides and thus to which this process will usually be applied are those which have a hard, thick testa. Seeds such as corn, sorghum, cotton, peas, beans, rice, wheat and the like fall into this category. Because of their hard outer coating, these seeds are relatively impervious to the sulfur-compound solution and are not easily damaged by the mild agitation and abrasion experienced in contacting them with the solution. It should be appreciated that the absolute amount of pesticide residue remaining on the seed is dependent upon the degree of permeation of the pesticide into the seed tissue as well as upon the variables of the process. Because the permeation of most pesticides into the above seeds is not deep, an almost quantitative removal of pesticide from the seed surfaces may be accomplished by the process of this invention. With this rationale, it is apparent that this process is applicable to other plant parts such as certain nuts and fruits, particularly citrus fruits.

The following examples are offered by way of specific illustration of the method of this invention. These examples are merely illustrative and are in nowise limiting on the invention described herein.

EXAMPLE 1

Corn seed, (v. Fiester White Hybrid Field Corn) was treated with a slurry containing 1 oz. of an 80 weight percent solid formulation of N-(1,1,2,2-tetrachloroethylthio)-cis-$\Delta^4$-tetrahydrophthalimide per bushel of seed. After treatment, analysis indicated that a residue of 626 p.p.m. N-(1,1,2,2-tetrachloroethylthio)-cis-$\Delta^4$ - tetrahydrophthalimide was present on the seeds. A 50 gm. portion of these seeds was placed in a flask and 40 ml. of water and 3 ml. of an aqueous solution containing 26 weight percent calcium polysulfide and 2 weight percent of a nonionic surfactant (ethylene oxide condensate of a nonylphenol) was added. The pH was alkaline. The flask was gently rotated for 1 hour at 25° C. Seed samples were removed at various time intervals, extracted with benzene and analyzed for pesticide residue. Table I reports the results of these analyses.

*Table I*

| Minutes rotated: | p.p.m N-(1,1,2,2-tetrachloroethylthio)-cis-$\Delta^4$-tetrahydrophthalimide remaining on seeds |
|---|---|
| 0 | 626 |
| 10 | 2.25 |
| 20 | 2.88 |
| 40 | 0.5 |
| 60, (limit of detection) | 0.2 |

EXAMPLE 2

Acid delinted and mechanically delinted cotton seed (v. Acala 4–42) were each treated with a 75 weight percent formulation of N-(1,1,2,2-tetrachloroethylthio)-cis-$\Delta^4$-tetrahydrophthalimide in clay at 2 oz. per 100 pounds seed for the acid delinted and 3 oz. per 100 pounds seeds for the mechanically delinted. The pesticide residue was determined to be 469 p.p.m. for the acid delinted and 702 p.p.m. for the mechanically delinted seed. A series of 25 gm. portions of the treated seeds were each placed in flasks and 40 mls. cold tap water and various amounts of an aqueous solution containing 26 weight percent calcium polysulfide and 2 weight percent nonionic surfactant (ethylene oxide condensate of a nonylphenol) were added. The pH's of these solutions were alkaline. The flasks were rotated for 10 minutes after which the seeds were removed, washed with water, extracted with 50 mls. benzene and analyzed for pesticide residue. The following results were obtained:

Acid delinted—

| Ml Ca polysulfide sol.: | Pesticide remaining p.p.m. |
|---|---|
| 1 | 3.2 |
| 3 | 2.8 |
| 5 | 0.4 |

Mechanically delinted—

| | |
|---|---|
| 1 | 14 |
| 3 | 6.6 |
| 5 | 4 |

EXAMPLE 3

The procedure of Example 2 was used except that the cotton seeds were treated with a 75 weight percent formulation of N-(trichloromethylthio)-cis-$\Delta^4$-tetrahydrophthalimide in clay at the same amounts per 100 pounds seed. The residue of this compound on the seeds was determined to be 750 p.p.m. for the acid delinted and 1124 p.p.m. for the mechanically delinted. The following results were obtained:

Acid delinted—

| Ml Ca polysulfide sol.: | Pesticide remaining p.p.m. |
|---|---|
| 1 | 1.3 |
| 3 | 0.8 |

Mechanically delinted:

| | |
|---|---|
| 1 | 4 |
| 3 | 1.6 |
| 5 | 0.48 |

EXAMPLE 4

In the manner described in Example 2 sorghum seed treated with a 60 weight percent formulation of N-(trichloromethylthio) - cis - $\Delta^4$ - tetrahydrophthalimide at 3 oz. per 100 pounds seed were treated and tested. The pesticide residue on the seeds was determined to be 1124 p.p.m. The following results were obtained:

| Ml Ca polysulfide sol.: | Pesticide remaining p.p.m. |
|---|---|
| 1 | 80 |
| 3 | 20 |

EXAMPLE 5

Corn seed (yellow hybrid field) was treated with a 75 weight percent formulation of the desired pesticidal compound at 1 oz. per 100 pounds of seed. The pesticide residue on the seeds was determined to be about 700 p.p.m. A series of 25 gm. portions of these seeds were placed in flasks. Forty mls. of a water solution of the desired sulfur compound was added to each. A control series using 40 mls. plain water was run concurrently for comparison. The flasks were rotated for the various periods, and the seeds were removed, washed with water, extracted with benzene and analyzed for pesticide residue. The particulars of these tests and the results from them are contained in Table II.

Table II

| Pesticide on Seed | Sulfur Compound | Solution, M | Time Rotated (Min.) | Pesticide Remaining, p.p.m. |
|---|---|---|---|---|
| TCE | Na₂S | [1] 0.5 | 30 | 8 |
| TCE | Na₂S | 0.5 | 10 | 11 |
| TCE | Na₂S | 0.5 | 30 | 6 |
| TCE | Na₂SO₃ | [1] 0.5 | 30 | 20 |
| TCE | Na₂SO₃ | 0.5 | 10 | 64 |
| TCE | Na₂SO₃ | 0.5 | 30 | 16 |
| TCE | Na₂S₂O₃ | [1] 0.5 | 30 | 32 |
| TCE | Na₂S₂O₃ | 0.5 | 10 | 70 |
| TCE | Na₂S₂O₃ | 0.5 | 30 | 40 |
| TCE | Ammonium polysulfide. | ([2]) | 20 | 6 |
| TCM | ---do--- | ([2]) | 20 | 1 |
| TCE | None-cold tap water | | 10 | 78 |
| TCE | ---do--- | | 30 | 57 |

[1] 40 mls. of tap water and 5 mls. of indicated sulfur compound.
[2] 40 mls. of tap water and 3 mls. of 30 weight percent aqueous solution of polysulfide.
TCE = N-(1,1,2,2-tetrachloroethylthio)-cis-Δ⁴-tetrahydrophthalimide.
TCM = N-(trichloromethylthio)-cis-Δ⁴-tetrahydrophthalimide.

EXAMPLE 6

Into a set of flasks were charged 100 mg. (±2.2 mg.) portions of a 25 weight percent formulation of O,O-dimethyl-S-[1,2-bis(ethoxycarbonyl)-ethyl] phosphorodithioate in clay and 40 mls. of tap water. To these mixtures were added either 1, 3 or 5 mls. of an aqueous solution containing 26 weight percent calcium polysulfide and 2 weight percent nonionic surfactant (ethylene oxide condensate of a nonylphenol). The vessels were rotated for various time intervals. A 50 ml. portion of benzene was then added and the vessels were rotated for an additional 20 minutes. The contents of each vessel were analyzed for the presence of the phosphorodithioate. These following results were obtained:

| Mls. Ca polysulfide sol. | Minutes Rotated | Phosphorodithioate destroyed, percent |
|---|---|---|
| 1 | 5 | 20 |
|   | 20 | 70 |
|   | 40 | 95 |
| 3 | 5 | 60 |
|   | 20 | 84 |
|   | 40 | >99 |
| 5 | 5 | 70 |
|   | 20 | 90 |
|   | 40 | >99 |

EXAMPLE 7

Into a set of flasks were placed 250 mg. portions of an 80 weight percent formulation of N-(1,1,2,2-tetrachloroethylthio)-cis-Δ⁴-tetrahydrophthalimide in clay and 5.0 mls. water at a pH of 11. To these mixtures were added 1.5 mls. mercaptoacetic acid. The contents of the flasks were mixed with slow agitation and then analyzed for pesticide content. The following results were obtained:

Time (hrs.):     Pesticide destroyed percent
  0.5 ---------------------------------- 22.2
  1 ------------------------------------ 35.6
  2 ------------------------------------ 66.7
  7.5 ---------------------------------- 92.7
  16 ----------------------------------- 96.3

Example 8 illustrates the use of other aqueous solvents in the process of this invention.

EXAMPLE 8

The procedure according to Example 1 was employed using corn seed having 485 p.p.m. N-(1,1,2,2-tetrachloroethylthio)-cis-Δ⁴-tetrahydrophthalimide on them. The 25 gm. seed samples were treated with 40 mls. of the desired solvent and 3 mls. of the aqueous solution of calcium polysulfide described in Example 1. For comparison, control series without the polysulfide were also run. Rotation took place for 10 minutes. The results of these tests are tabulated below.

Solvent:     Pesticide remaining p.p.m.
  10% acetone-water & polysulfide ----------- 1.8
  10% acetone-water (control) -------------- 68

Examples 9 and 10 illustrate the effect of temperature and the degree of agitation on the process of this invention.

EXAMPLE 9

The procedure of Example 1 was used with corn seed having 485 p.p.m. N-(1,1,2,2-tetrachloroethylthio)-cis-Δ⁴-tetrahydrophthalimide on them. The samples were contacted for 3 minutes with 40 mls. tap water and various amounts of the polysulfide solution described in Example 1 at temperatures ranging from 25 to 35° C. For convenience, the results of these tests are tabulated below.

| Temperature, °C. | Ml Polysulfide Sol. | Pesticide Remaining, p.p.m. |
|---|---|---|
| 25 | 0.3 | 7.5 |
|    | 1.0 | 4.2 |
|    | 1.5 | 2.5 |
| 30 | 0.1 | 6.0 |
|    | 0.3 | 2.3 |
|    | 1.0 | 1.7 |
| 35 | 0.1 | 3.4 |
|    | 0.3 | 3.2 |
|    | 1.0 | 1.8 |

These results illustrate a general increase in the amount of destruction with increasing contact temperature.

EXAMPLE 10

The procedure of Example 1 was used with corn seed having 485 p.p.m. N-(1,1,2,2-tetrachloroethylthio)-cis-Δ⁴-tetrahydrophthalimide on them. The seeds were contacted for 3 minutes with 40 mls. tap water and 0.3 ml. of the polysulfide solution described in Example 1 per 25 gm. sample of seed at 30° C. under various degrees of rotation and agitation. The results were as follows:

Extent of agitation:     Pesticide remaining p.p.m.
  Mild -------------------------------- 11.0
  Moderate --------------------------- 6.0
  Vigorous --------------------------- 1.5

As will be evident to those skilled in the art, various modifications on this process can be made or followed, in the light of the foregoing disclosure and discussion, without departing from the spirit or scope of the disclosure or from the scope of the following claims.

I claim:
1. A method for attenuating pesticide residues present on seeds which have been treated with a pesticide having a methyl phosphate group or a halogen of atomic number 17 to 53 bonded to a saturated carbon atom which is alpha or beta to an oxygen or sulfur atom which comprises contacting the treated seeds with an effective amount of an aqueous solution of an ionizable sulfide, inorganic sulfite or inorganic thiosulfate at a pH of at least 7.

2. The method of claim 1 wherein said pesticide having a halogen of atomic number 17 to 53 is an N-polyhaloalkylthio fungicide wherein the alkyl group contains 1 to 2 carbon atoms.

3. The method of claim 1 wherein said pH is 8 to 12.

4. The method of claim 1 wherein said contacting is done in the presence of a surfactant which is stable at said pH and does not form a precipitate with said aqueous solution.

5. A method for attenuating pesticide residues present on seeds which have been treated with a pesticide having a methyl phosphate group or a halogen of atomic number 17 to 53 bonded to a saturated carbon atom which is alpha or beta to an oxygen or sulfur atom which comprises contacting the treated seeds with an effective amount of an aqueous solution of an inorganic sulfide, sulfite or thiosulfate at a pH of 8 to 12.

6. The method of claim 5 wherein said pesticide having a halogen of atomic number 17 to 53 is an N-polyhaloalkylthio fungicide wherein the alkyl group contains 1 to 2 carbon atoms.

7. The method of claim 5 wherein said pesticide having a halogen of atomic number 17 to 53 is N-(1,1,2,2-tetrachloromethylthio)-cis-$\Delta^4$-tetrahydrophthalimide.

8. The method of claim 5 wherein the contacting is done in the presence of a surfactant which is stable at said pH and does not form a precipitate with said aqueous solution.

9. A method for attenuating pesticide residues present on seeds which have been treated with a pesticide having a dimethyl phosphate group or a halogen of atomic number 17 to 53 bonded to a saturated carbon atom which is alpha or beta to an oxygen or sulfur atom which comprises contacting the treated seeds with an effective amount of an aqueous solution of an inorganic sulfide at a pH of 8 to 12.

10. The method of claim 9 wherein said sulfide is an alkali metal, alkaline earth metal or ammonium sulfide.

11. The method of claim 9 wherein said sulfide is calcium polysulfide.

No references cited.

JULIAN S. LEVITT, *Primary Examiner.*

S. J. FRIEDMAN, *Assistant Examiner.*